United States Patent
Casati (10) Patent No.: US 11,729,604 B2
(45) Date of Patent: Aug. 15, 2023

(54) APPARATUS, METHOD AND COMPUTER PROGRAM

(71) Applicant: NOKIA TECHNOLOGIES OY, Espoo (FI)

(72) Inventor: Alessio Casati, Surrey (GB)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 17/255,298

(22) PCT Filed: Jun. 26, 2018

(86) PCT No.: PCT/EP2018/067124
§ 371 (c)(1),
(2) Date: Dec. 22, 2020

(87) PCT Pub. No.: WO2020/001754
PCT Pub. Date: Jan. 2, 2020

(65) Prior Publication Data
US 2021/0266729 A1 Aug. 26, 2021

(51) Int. Cl.
*H04W 8/24* (2009.01)
*H04L 1/1607* (2023.01)
*H04W 8/06* (2009.01)

(52) U.S. Cl.
CPC ............ *H04W 8/24* (2013.01); *H04L 1/1614* (2013.01); *H04W 8/06* (2013.01)

(58) Field of Classification Search
CPC .......... H04W 8/06; H04W 8/22; H04W 8/24; H04W 88/06; H04W 36/00; H04L 1/1614
See application file for complete search history.

(56) References Cited

U.S. PATENT DOCUMENTS

| 8,223,797 | B2 | 7/2012 | Liang et al. | |
| 2015/0264637 | A1* | 9/2015 | Zaus | H04W 48/16 455/434 |
| 2015/0327269 | A1* | 11/2015 | Kim | H04W 88/02 370/329 |
| 2017/0367073 | A1* | 12/2017 | Murugan | H04B 1/0053 |
| 2018/0359628 | A1* | 12/2018 | Breuer | H04L 65/80 |
| 2019/0306925 | A1* | 10/2019 | Iskander | H04L 5/0094 |

FOREIGN PATENT DOCUMENTS

| EP | 2 405 679 A1 | 1/2012 |
| WO | WO 2014/112848 A1 | 7/2014 |
| WO | WO 2015/180779 A1 | 12/2015 |

OTHER PUBLICATIONS

International Search Report and Written Opinion dated Mar. 27, 2019 corresponding to International Patent Application No. PCT/EP2018/067124.
First Examination Report dated Dec. 30, 2021 corresponding to Indian Patent Application No. 202047056412.
Communication pursuant to Article 94(3) EPC dated Nov. 24, 2022 corresponding to European Patent Application No. 18737183.6.

\* cited by examiner

*Primary Examiner* — Mandish K Randhawa
(74) *Attorney, Agent, or Firm* — Squire Patton Boggs (US) LLP (57) ABSTRACT

An apparatus comprising means for performing: receiving an indication of a set of at least two different capabilities of the apparatus that are to be made available to a network in which the apparatus is operating; generating capability information of the apparatus in accordance with the received indication; and making the generated capability information available to the network.

17 Claims, 6 Drawing Sheets

APPARATUS, METHOD AND COMPUTER PROGRAM

FIELD

This disclosure relates to communications, and more particularly to an apparatus, method and computer program in a wireless communication system. More particularly the present invention relates to capability information communicated between user equipment and a network.

BACKGROUND

In cellular communication systems, a user equipment (UE) provides the network with network and radio access network (RAN) capabilities of the UE.

STATEMENT OF INVENTION

According to a first aspect there is provided an apparatus comprising means for performing: receiving an indication of a set of at least two different capabilities of the apparatus that are to be made available to a network in which the apparatus is operating; generating capability information of the apparatus in accordance with the received indication; and making the generated capability information available to the network.

According to an example, the indication of a set of at least two different capabilities comprises at least two fields corresponding to the at least two different capabilities of the apparatus, the apparatus comprising means for populating the at least two fields.

According to an example, the indication of a set of at least two different capabilities comprises a form.

According to an example, the apparatus comprises means for performing: receiving the indication in response to registration of the apparatus in the network.

According to an example, the apparatus comprises means for performing generating the capability information in a format that matches a format indicated by the network.

According to an example, the format comprises a bitmap.

According to an example, the apparatus comprises means for performing storing the received indication of capability information at the apparatus, and associating the received indication with the network from which the indication was received.

According to an example, the apparatus comprises means for performing storing the generated capability information in a compressed manner.

According to an example, the apparatus comprises means for performing storing the generated capability information according to a shorthand representation, the shorthand representation being indicated by the network.

According to an example, the apparatus comprises means for performing associating version information to the stored indication received from the network, and associating version information to the generated capability information, for enabling the network to determine whether the stored indication from the network and corresponding generated capability information is valid.

According to an example, the stored capability information indicated by the network being valid throughout the network.

According to an example, the apparatus comprises means for performing storing received indications of capability information for two or more different networks.

According to an example, the network comprising a public land mobile network.

According to an example, the set of at least two different capabilities comprises any two or more of: RF parameters supported by the apparatus; UE category; Packet Data Convergence Protocol parameters; RLC parameters; Physical layer parameters; Measurement parameters; Inter-RAT parameters; release information, UE network capabilities.

According to an example, the apparatus comprises means for performing sending the generated capability information to the network in response to a request received at the apparatus from the network; or during a connection establishment with the network.

According to an example, the apparatus comprises means for performing informing the network that the apparatus has ability to receive the indication, store the indication, and generate the capability information according to the indication.

According to a second aspect there is provided an apparatus comprising: at least one processor; and at least one memory including computer program code; the at least one memory and the computer program code configured to, with the at least one processor, cause the apparatus at least to perform: receiving an indication of a set of at least two different capabilities of the apparatus that are to be made available to a network in which the apparatus is operating; generating capability information of the apparatus in accordance with the received indication; and making the generated capability information available to the network.

According to an example, the indication of a set of at least two different capabilities comprises at least two fields corresponding to the at least two different capabilities of the apparatus, the apparatus comprising means for populating the at least two fields.

According to an example, the indication of a set of at least two different capabilities comprises a form.

According to an example, the at least one memory and the computer program code configured to, with the at least one processor, cause the apparatus at least to perform: receiving the indication in response to registration of the apparatus in the network.

According to an example, the at least one memory and the computer program code configured to, with the at least one processor, cause the apparatus at least to perform generating the capability information in a format that matches a format indicated by the network.

According to an example, the format comprises a bitmap.

According to an example, the at least one memory and the computer program code configured to, with the at least one processor, cause the apparatus at least to perform storing the received indication of capability information at the apparatus, and associating the received indication with the network from which the indication was received.

According to an example, the at least one memory and the computer program code configured to, with the at least one processor, cause the apparatus at least to perform storing the generated capability information in a compressed manner.

According to an example, the at least one memory and the computer program code configured to, with the at least one processor, cause the apparatus at least to perform storing the generated capability information according to a shorthand representation, the shorthand representation being indicated by the network.

According to an example, the at least one memory and the computer program code configured to, with the at least one processor, cause the apparatus at least to perform associating version information to the stored indication received from the network, and associating version information to the generated capability information, for enabling the network to determine whether the stored indication from the network and corresponding generated capability information is valid.

According to an example, the stored capability information indicated by the network being valid throughout the network.

According to an example, the at least one memory and the computer program code configured to, with the at least one processor, cause the apparatus at least to perform storing received indications of capability information for two or more different networks.

According to an example, the network comprising a public land mobile network.

According to an example, the set of at least two different capabilities comprises any two or more of: RF parameters supported by the apparatus; UE category; Packet Data Convergence Protocol parameters; RLC parameters; Physical layer parameters; Measurement parameters; Inter-RAT parameters; release information, UE network capabilities.

According to an example, the at least one memory and the computer program code configured to, with the at least one processor, cause the apparatus at least to perform sending the generated capability information to the network in response to a request received at the apparatus from the network; or during a connection establishment with the network.

According to an example, the at least one memory and the computer program code configured to, with the at least one processor, cause the apparatus at least to perform informing the network that the apparatus has ability to receive the indication, store the indication, and generate the capability information according to the indication.

According to a third aspect there is provided an apparatus comprising means for performing: sending an indication of a set of at least two different capabilities of a user equipment that are to be made available by the user equipment to a network in which the user equipment is operating.

According to an example, the indication of a set of at least two different capabilities comprises at least two fields corresponding to the at least two different capabilities of the user equipment.

According to an example, the indication of a set of at least two capabilities comprises a form.

According to an example, the apparatus comprises means for performing detecting registration of the user equipment in the network, the sending the indication being in response to the detecting registration.

According to an example, the apparatus comprises means for receiving capability information from a user equipment in the network in accordance with the indication of a set of at least two different capabilities.

According to an example, the apparatus comprises means for performing indicating a shorthand representation to the user equipment, for use by the user equipment in storing user equipment capability information in accordance with the shorthand.

According to an example, the apparatus comprises means for performing decoding a shorthand representation information received from the user equipment.

According to a fourth aspect there is provided an apparatus comprising: at least one processor; and at least one memory including computer program code; the at least one memory and the computer program code configured to, with the at least one processor, cause the apparatus at least to perform: sending an indication of a set of at least two different capabilities of a user equipment that are to be made available by the user equipment to a network in which the user equipment is operating.

According to an example, the indication of a set of at least two different capabilities comprises at least two fields corresponding to the at least two different capabilities of the user equipment.

According to an example, the indication of a set of at least two different capabilities comprises a form.

According to an example, the at least one memory and the computer program code configured to, with the at least one processor, cause the apparatus at least to perform: detecting registration of the user equipment in the network, the sending the indication being in response to the detecting registration.

According to an example, the at least one memory and the computer program code configured to, with the at least one processor, cause the apparatus at least to perform: receiving capability information from a user equipment in the network in accordance with the indication of a set of at least two different capabilities.

According to an example, the at least one memory and the computer program code configured to, with the at least one processor, cause the apparatus at least to perform: indicating a shorthand representation to the user equipment, for use by the user equipment in storing user equipment capability information in accordance with the shorthand.

According to an example, the at least one memory and the computer program code configured to, with the at least one processor, cause the apparatus at least to perform: decoding a shorthand representation information received from the user equipment.

According to a fifth aspect there is provided a method comprising: receiving an indication of a set of at least two different capabilities of an apparatus that are to be made available to a network in which the apparatus is operating; generating capability information of the apparatus in accordance with the received indication; and making the generated capability information available to the network.

According to an example, the indication of a set of at least two different capabilities comprises at least two fields corresponding to the at least two different capabilities of the apparatus, the method comprising populating the at least two fields.

According to an example, the indication of a set of at least two different capabilities comprises a form.

According to an example, the method comprises receiving the indication in response to registration of the apparatus in the network.

According to an example, the method comprises generating the capability information in a format that matches a format indicated by the network.

According to an example, the format comprises a bitmap.

According to an example, the method comprises storing the received indication of capability information at the apparatus, and associating the received indication with the network from which the indication was received.

According to an example, the method comprises storing the generated capability information in a compressed manner.

According to an example, the method comprises storing the generated capability information according to a shorthand representation, the shorthand representation being indicated by the network.

According to an example, the method comprises associating version information to the stored indication received from the network, and associating version information to the generated capability information, for enabling the network to determine whether the stored indication from the network and corresponding generated capability information is valid.

According to an example, the stored capability information indicated by the network being valid throughout the network.

According to an example, the method comprises storing received indications of capability information for two or more different networks.

According to an example, the network comprising a public land mobile network.

According to an example, the set of at least two different capabilities comprises any two or more of: RF parameters supported by the apparatus; UE category; Packet Data Convergence Protocol parameters; RLC parameters; Physical layer parameters; Measurement parameters; Inter-RAT parameters; release information, UE network capabilities.

According to an example, the method comprises sending the generated capability information to the network in response to a request received at the apparatus from the network; or during a connection establishment with the network.

According to an example, the apparatus comprises means for performing informing the network that the apparatus has ability to receive the indication, store the indication, and generate the capability information according to the indication.

According to a sixth aspect there is provided a computer program comprising instructions for causing an apparatus to perform at least the following: receiving an indication of a set of at least two different capabilities of an apparatus that are to be made available to a network in which the apparatus is operating; generating capability information of the apparatus in accordance with the received indication; and making the generated capability information available to the network.

According to a seventh aspect there is provided a computer program comprising instructions stored thereon for performing at least the following: receiving an indication of a set of at least two different capabilities of an apparatus that are to be made available to a network in which the apparatus is operating; generating capability information of the apparatus in accordance with the received indication; and making the generated capability information available to the network.

According to an eighth aspect there is provided a non-transitory computer readable medium comprising program instructions for causing an apparatus to perform at least the following: receiving an indication of a set of at least two different capabilities of an apparatus that are to be made available to a network in which the apparatus is operating; generating capability information of the apparatus in accordance with the received indication; and making the generated capability information available to the network.

According to a ninth aspect there is provided a non-transitory computer readable medium comprising program instructions stored thereon for performing at least the following: receiving an indication of a set of at least two different capabilities of an apparatus that are to be made available to a network in which the apparatus is operating; generating capability information of the apparatus in accordance with the received indication; and making the generated capability information available to the network.

According to a tenth aspect there is provided a method comprising: sending an indication of a set of at least two different capabilities of a user equipment that are to be made available by the user equipment to a network in which the user equipment is operating.

According to an example, the indication of a set of at least two different capabilities comprises at least two fields corresponding to the at least two different capabilities of the user equipment.

According to an example, the indication of a set of at least two different capabilities comprises a form.

According to an example, the method comprises detecting registration of the user equipment in the network, the sending the indication being in response to the detecting registration.

According to an example, the method comprises receiving capability information from a user equipment in the network in accordance with the indication of a set of at least two different capabilities.

According to an example, the method comprises indicating a shorthand representation to the user equipment, for use by the user equipment in storing user equipment capability information in accordance with the shorthand.

According to an example, the method comprises decoding a shorthand representation information received from the user equipment.

According to an eleventh aspect there is provided a computer program comprising instructions for causing an apparatus to perform at least the following: sending an indication of a set of at least two different capabilities of a user equipment that are to be made available by the user equipment to a network in which the user equipment is operating.

According to a twelfth aspect there is provided a computer program comprising instructions stored thereon for performing at least the following: sending an indication of a set of at least two different capabilities of a user equipment that are to be made available by the user equipment to a network in which the user equipment is operating.

According to a thirteenth aspect there is provided a non-transitory computer readable medium comprising program instructions for causing an apparatus to perform at least the following: sending an indication of a set of at least two different capabilities of a user equipment that are to be made available by the user equipment to a network in which the user equipment is operating.

According to a fourteenth aspect there is provided a non-transitory computer readable medium comprising program instructions stored thereon for performing at least the following: sending an indication of a set of at least two different capabilities of a user equipment that are to be made available by the user equipment to a network in which the user equipment is operating.

BRIEF DESCRIPTION OF FIGURES

The invention will now be described in further detail, by way of example only, with reference to the following examples and accompanying drawings, in which.

DETAILED DESCRIPTION

Before explaining in detail the examples, certain general principles of a wireless communication system and mobile communication devices are briefly explained with reference to FIGS. 1 to 2 to assist in understanding the technology underlying the described examples.

Figure 1:
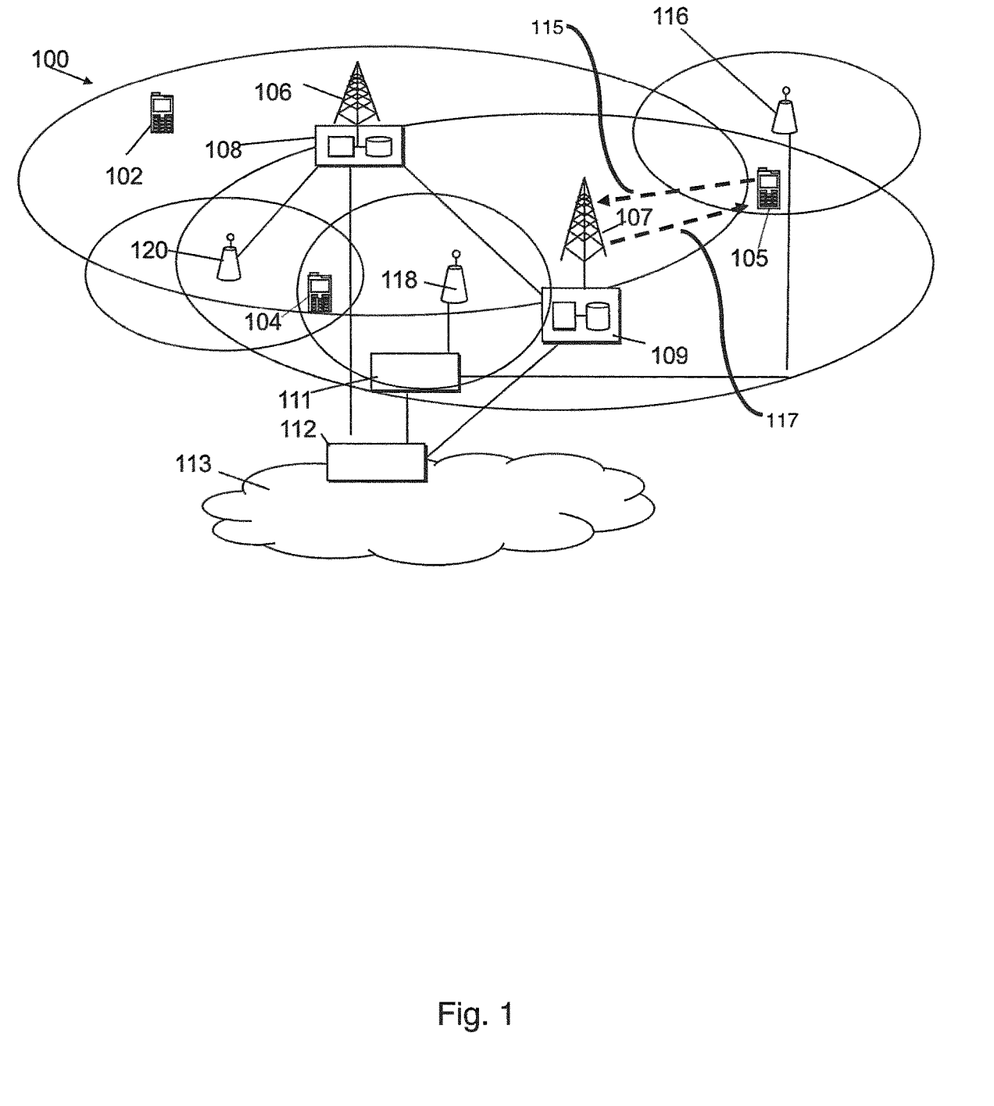
FIG. 1 shows a schematic example of a wireless communication system where the invention may be implemented.

In a wireless communication system 100, such as that shown in FIG. 1, wireless communication devices, for example, user equipment (UE) or MTC devices 102, 104, 105 are provided wireless access via at least one base station or similar wireless transmitting and/or receiving wireless infrastructure node or point. Such a node can be, for example, a base station or an eNodeB (eNB), or in a 5G system a Next Generation NodeB (gNB), or other wireless infrastructure node. These nodes will be generally referred to as base stations. Base stations are typically controlled by at least one appropriate controller apparatus, so as to enable operation thereof and management of mobile communication devices in communication with the base stations. The controller apparatus may be located in a radio access network (e.g. wireless communication system 100) or in a core network (CN) (not shown) and may be implemented as one central apparatus or its functionality may be distributed over several apparatus. The controller apparatus may be part of the base station and/or provided by a separate entity such as a Radio Network Controller. In FIG. 1 control apparatus 108 and 109 are shown to control the respective macro level base stations 106 and 107. In some systems, the control apparatus may additionally or alternatively be provided in a radio network controller. Other examples of radio access system comprise those provided by base stations of systems that are based on technologies such as 5G or new radio, wireless local area network (WLAN) and/or WiMax (Worldwide Interoperability for Microwave Access). A base station can provide coverage for an entire cell or similar radio service area.

In FIG. 1 base stations 106 and 107 are shown as connected to a wider communications network 113 via gateway 112. A further gateway function may be provided to connect to another network.

The smaller base stations 116, 118 and 120 may also be connected to the network 113, for example by a separate gateway function and/or via the controllers of the macro level stations. The base stations 116, 118 and 120 may be pica or femto level base stations or the like. In the example, stations 116 and 118 are connected via a gateway 111 whilst station 120 connects via the controller apparatus 108. In some embodiments, the smaller stations may not be provided.

Figure 2:
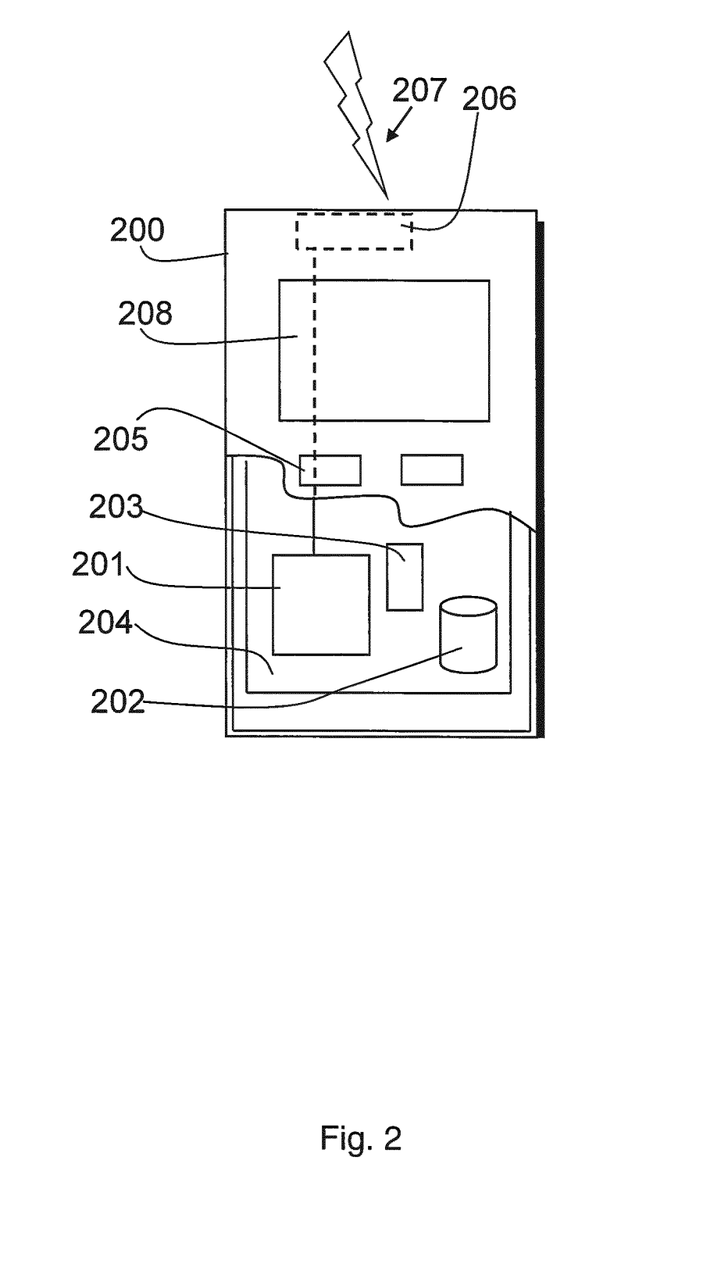
FIG. 2 shows an example of a communication device.

A possible wireless communication device will now be described in more detail with reference to FIG. 2 showing a schematic, partially sectioned view of a communication device 200. Such a communication device is often referred to as user equipment (UE) or terminal. An appropriate mobile communication device may be provided by any device capable of sending and receiving radio signals. Non-limiting examples comprise a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services comprise two-way or multi-way calls, data communication or multimedia services or simply an access to a data communications network system, such as the Internet. Users may also be provided broadcast or multicast data. Non-limiting examples of the content comprise downloads, television and radio programs, videos, advertisements, various alerts and other information.

A wireless communication device may be for example a mobile device, that is, a device not fixed to a particular location, or it may be a stationary device. The wireless device may need human interaction for communication, or may not need human interaction for communication. In the present teachings the terms UE or "user" are used to refer to any type of wireless communication device.

The wireless device 200 may receive signals over an air or radio interface 207 via appropriate apparatus for receiving and may transmit signals via appropriate apparatus for transmitting radio signals. In FIG. 2 transceiver apparatus is designated schematically by block 206. The transceiver apparatus 206 may be provided for example by means of a radio part and associated antenna arrangement. The antenna arrangement may be arranged internally or externally to the wireless device.

A wireless device is typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204. The user may control the operation of the wireless device by means of a suitable user interface such as key pad 205, voice commands, touch sensitive screen or pad, combinations thereof or the like. A display 208, a speaker and a microphone can be also provided. Furthermore, a wireless communication device may comprise appropriate connectors (either wired or wireless) to other devices and/or for connecting external accessories, for example hands-free equipment, thereto. The communication devices 102, 104, 105 may access the communication system based on various access techniques.

Figure 3:
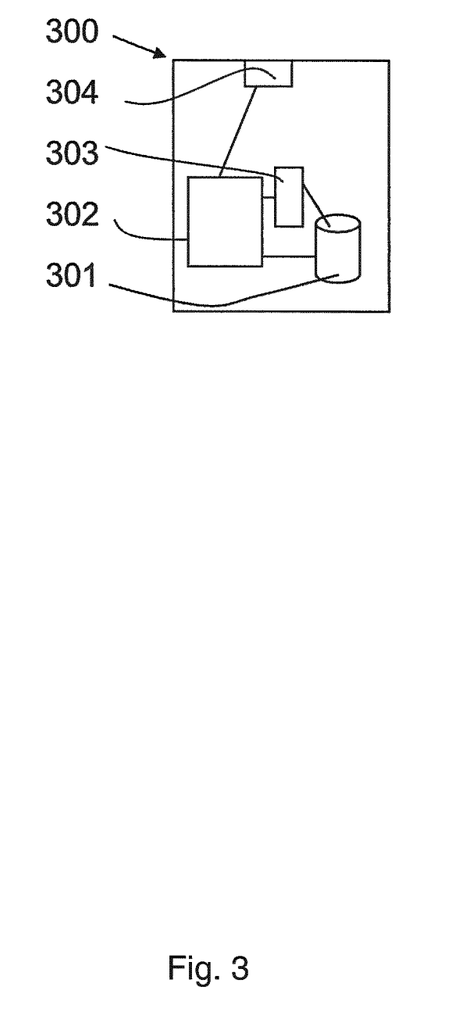
FIG. 3 shows an example of a control apparatus.

FIG. 3 shows an example of a control apparatus for a communication system, for example to be coupled to and/or for controlling a station of an access system, such as a RAN node, e.g. a base station, gNB, a central unit of a cloud architecture or a node of a core network such as an MME or S-GW, a scheduling entity such as a spectrum management entity, or a server or host. The control apparatus may be integrated with or external to a node or module of a core network or RAN. In some embodiments, base stations comprise a separate control apparatus unit or module. In other embodiments, the control apparatus can be another network element such as a radio network controller or a spectrum controller. In some embodiments, each base station may have such a control apparatus as well as a control apparatus being provided in a radio network controller. The control apparatus 300 can be arranged to provide control on communications in the service area of the system. The control apparatus 300 comprises at least one memory 301, at least one data processing unit 302, 303 and an input/output interface 304. Via the interface the control apparatus can be coupled to a receiver and a transmitter of the base station. The receiver and/or the transmitter may be implemented as a radio front end or a remote radio head. For example the control apparatus 300 or processor 201 can be configured to execute an appropriate software code to provide the control functions.

Referring back to FIG. 1, the network 100 shown may comprise a public land mobile network (PLMN). A PLMN is a network that is established and operated by an administration or by a recognized operating agency (ROA) for the purpose of providing land mobile telecommunications services to the public. For example network providers to which users subscribe may each operate a PLMN. Each PLMN may inter-operate with other PLMNs, for example for the purpose of handover or inter-operability. A PLMN may also be interconnected with a fixed system such as the public switched telephone network (PSTN).

A UE may provide the PLMN with information of UE capability. This is shown schematically at 115, which shows UE 105 providing capability information to base station 107. The capability information may be used for handover, cell optimisation etc. Over time, a quantity of information that needs to be provided by the UE or multiple UEs can become significant. Likewise the PLMN (e.g. via base station 107) can provide information to the UE 105. This is shown schematically at 117. Some proposals have been made to optimise this.

In previous 3GPP releases, the RAN could inform UE of frequency band information, for example frequency bands supported by the RAN. The information provided by the RAN could therefore to some extent be considered a filter to be used by the UE, in as much as it provided information of supported frequency bands and not unsupported frequency bands. Using the filtered information, the UE could then provide to the RAN a subset of the UE's information e.g. information relevant to the supported frequency bands only. However, a disadvantage to this proposal was that each RAN node independently decided its own filter information, so if a UE moved to another RAN node which did not support certain frequency bands or band combinations already indicated by the UE, but did support others not previously indicated by the UE, then call drops could be experienced, because the source node may not have known if the UE supported the target node capabilities. A possible way round this would be for RAN nodes to signal their filter information with each other, but this may significantly increase traffic within the network. Furthermore this would be possible only between some neighbours and not PLMN-wide, as it is too complex. Furthermore, this proposal only dealt with frequency band information.

A different proposal is for a UE capabilities database to be stored in the network. Each UE would have an identifier used as an index in the database for retrieval of respective UE capability information. A disadvantage of this option is that maintenance and operation of the database may be a complex and expensive task. Furthermore, if the RAN cannot reach the database for any reasons then outages may be caused. Furthermore, the UE capabilities may change due to settings operated by the users of the UE (which is to say, there can be some dynamic aspect to what the UE capabilities really are—e.g. a user may disable 2G, or LTE to just behave as LTE-Cat-M1 etc.)

Accordingly there is proposed in the present application improved capability information exchange between a UE and the network e.g. PLMN. According to some examples the capability information which a UE receives (and subsequently provides) is valid over an entire PLMN (so not just for a localised region or set of RAN nodes). The proposal may avoid continuous/regular communication of filters to the UE. In examples the proposal is distributed, so does not necessarily require a centralised database storing UE capability information. According to examples the proposal is also backward compatible with existing RAN nodes.

In examples a PLMN (e.g. PLMN node) stores information pertaining to UE capabilities. For example this may comprise information of UE capabilities that the PLMN may require from the UE in order to handle the UE (and indeed other UEs) in the PLMN. The UE capability information may comprise, for example, UE radio capabilities as documented in 3GPP TS 36.306 and 38.306. For example, UE capabilities may include UE radio access capability parameters. UE radio access capability parameters may include any one or more of: RF parameters supported by the UE (e.g. frequency bands and frequency band combinations); UE category and related parameters; PDCP (Packet Data Convergence Protocol) parameters such as ROHC (Robust Header Compression) profile supported; RLC (radio link control) parameters; Physical layer parameters; Measurement parameters; Inter-RAT (Radio Access Technology) parameters; general parameters such as an indication of which release is supported by the UE. UE "category" may refer to the categories set forth in 3GPP TS 36.306 chapter 4.1. The UE category may define a combined uplink and downlink capability. The parameters set by the UE Category may define the downlink and, respectively, uplink physical layer parameter values of the UE.

The capability information may be stored in a list at one or more PLMN nodes (e.g. MME/AMF). In some examples this may comprise a comprehensive list i.e. a list of all UE capability information which may be required by the PLMN. In some examples the list of capability information the network requires UEs to declare, may be considered to be considered to comprise a set of UE capability information. In examples the set of UE capability information comprises two or more different types of UE capability information that the PLMN wants or requires. For example the set comprises at least a first UE capability and a second UE capability, the first UE capability being of a different type to the second UE capability. By storing (and sending) the different capabilities together as a set, this differs from sending the information of the different capabilities separately. Therefore the UE capability information may be considered to be comprised together within the set. The set of information may be considered to comprise a "form". The set of UE capability information (e.g. form) can be transmitted from the PLMN (e.g. from an MME or AMF) to the UE(s), so that the UE(s) know which capability information may be required by the network in due course. The UE(s) can then use the received form to "fill in" or populate the required capabilities information to be sent to the network. By communicating the UE capability information together as a set, this obviates a need to send the information of the different capabilities separately, and thus may decrease signalling in the system. The "form" may therefore be considered a file comprising fields to be filled in or populated by one or more UEs. More particularly the form may be considered a data file comprising at least two UE capability fields to be populated by a UE. Once the UE has populated those fields, it can make the filled in form available to the network so that the network can obtain the UE capability information. Thus it will be understood that prior to being completed or filled in by one or more UEs (e.g. when stored at the network), the set of UE capability information (or form) may be considered an indication of a set of at least two different capabilities of user equipment that are to be made available to a network in which the user equipment is operating. In examples, the UE makes the completed UE capability information available to the network in a same format as per the indication received from the network. That is the UE also makes the information available to the network as a set of two or more different UE capabilities e.g. as a form. Therefore in some examples, if the form as sent to a UE lists capabilities in a certain order then the UE sends the capability information back in the same order (within the form). This makes it easy for the network to process the information. Thus, it may be considered that the PLMN may store a form which is used for indicating to one or more UEs which UE capability information the one or more UEs need to provide to the PLMN. The information that the UE provides back to the network may be considered generated capability information (having been generated by the UE).

Figure 4:
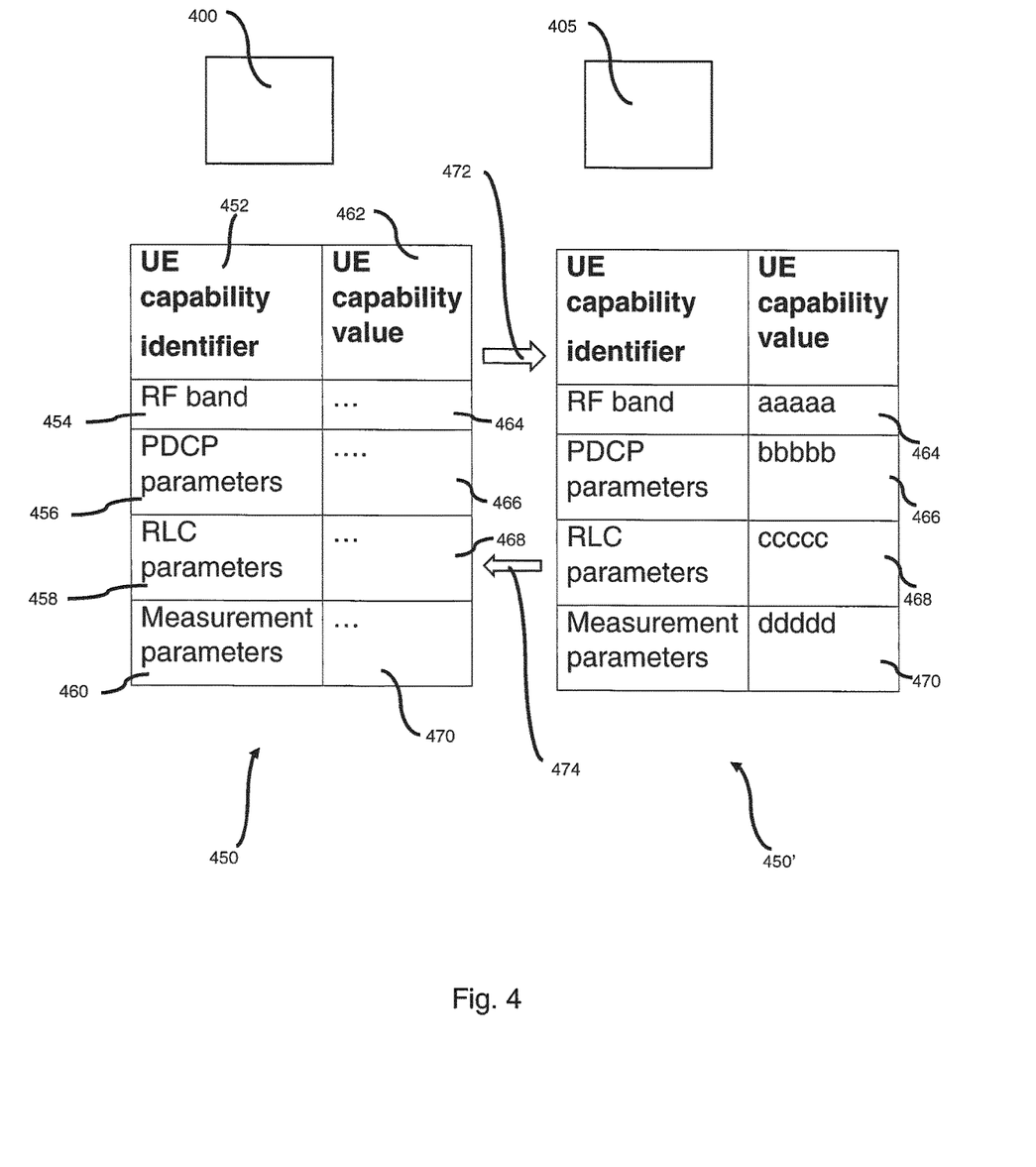
FIG. 4 shows a UE capability form according to an example

An example of such a form is shown schematically in FIG. 4. The form 450 comprises UE capability identifier fields 452. These fields 452 enable the network to indicate to a UE what UE capability information the network wants or requires. In some examples there are at least two such identifier fields. This enables a UE to provide capability information of two or more capabilities to the network simultaneously, which is efficient. In other words the form may be considered to comprise an indication of a set of at least two different capabilities of a UE that are to be made available to a network in which the UE is operating. In the example of FIG. 4 there are four identifier fields 452. A first identifier field 454 relates to capability information of a first type, in this example RF band information. A second identifier field 456 relates to capability information of a second type, in this example PDCP parameters. A third identifier field 458 relates to capability information of a third type, in this example RLC parameters. A fourth identifier field 460 relates to capability information of a fourth type, in this example measurement parameters. Of course this is by way of example only and in some examples more or fewer fields may be provided (although as set out above, in some examples at least two fields are provided). The capability information types may also differ between examples. The form 450 comprises UE capability value fields 462 to be populated by the UE. In this example value field 464 corresponds to identifier field 454, value field 466 corresponds to identifier field 456, value field 468 corresponds to identifier field 458, value field 470 corresponds to identifier field 460. As shown on the left-hand side of FIG. 4 these value fields are yet to be populated by a UE. That is the value fields may be considered to be blank. Therefore the left-hand side of FIG. 4 may represent a form 450 prior to it being sent from the PLMN to a UE to be populated with the relevant information. In the example of FIG. 4 the form comprises a table e.g. a lookup table.

A network node of the PLMN is schematically shown at 400. The network node 400 may for example comprise an MME or an AMF. The node 400 may store the form 450 in its memory. The node 400 can send the form (or a copy of the form) to a UE 405 (or indeed a plurality of UEs). This is schematically shown by arrow 472. The UE 405 may then store the form in a memory of the UE and populate the value fields 462. This is schematically shown on the right hand side of FIG. 4 which shows a populated version of the form 450'. In other words the UE may generate capability information of the UE in accordance with the received indication. Of course the values shown (e.g. aaaa, bbbb) are only schematic representations of actual values which may be inserted by the UE. In some examples the form may comprise a bitmap, where each bit is set if the UE capability relating to the matching entry in the form is supported.

The UE can store the populated form 450'. The UE can also make the form available to the network. In other words the UE can make the generated capability information available to the network. For example the UE may send the populated form to the network, e.g. to network node 400 (or indeed any other network node). This is schematically shown by arrow 474. According to some examples the UE 405 may append or associate a UE identifier to the form. This enables the network to identify from which UE the form has been received.

According to some examples the UE capabilities form 450 is stored in a plurality of (and in some examples all) the network nodes of the PLMN that need to receive the capabilities information from the UE. Therefore in examples such network nodes need to be able to provide the form to the UE for the UE to fill in.

In some examples, at any point in time, all nodes within a PLMN use (e.g. store) the same form (or copies of the same form). In some examples, when a form is updated in a PLMN, the form is configured in all such network nodes with e.g. a time from which the updated form is valid (e.g. a timestamp). From the indicated time onwards, all UEs that are using the old form are requested to provide capabilities according to the new form. In some examples the network provides a new or updated form to the UE in response to detecting that the UE is using an old or out of date form. This may be enabled by e.g. erasing the stored UE capabilities in the network that are considered invalid or obsolete when the new form is deployed network-wide. Alternatively a UE may mark capabilities indicating "using an obsolete form", and if so which form version. This may enable the network to attempt to use the obsolete information in the interim.

In some examples two or more forms are maintained by a PLMN based on UE type e.g. a UE of machine type communications supporting NB-IoT radio access only, which accesses a network slice for NB-IoT UEs only, may be given a form which differs from a general purpose smartphone. In some examples the UE first declares which UE category the UE belongs to or basic capabilities the UE supports, then a form may be provided based on the declaration. Therefore it may be considered that a PLMN stores two or more different forms, the different forms for respective UEs of different types.

This approach differs from the earlier "filter" proposal, at least in that the capability information is not limited to frequency band information. Furthermore, by requesting the UE to provide the capability information by means of a form valid for the whole PLMN, in some examples the form pertaining to multiple capabilities can be sent as a single item which has a potentially shorter representation than sending the information of different capabilities separately, and the PLMN does not need the UE to separately signal information elements regarding each UE capability the PLMN requires information of, because the form returned by the UE will contain all the necessary information in one place. Furthermore, in the earlier described "filter" proposal the filters needed to be regularly or continuously provided to the UEs, to account for changing frequency information and different information stored by different network nodes (and indeed at times this was a cause of call drops). In some 1.0 present examples the UE is provided with information of all the capability information it needs to provide to the network, and therefore does not have to receive regular updates of the filter.

That is in present examples, a UE need be provided with the capability information (e.g. form) only once or seldom, since the form comprises a detailed or comprehensive list of capability information which may be required when operating within a PLMN. Thus the capability information required by the network (e.g. form) may be considered to be used on a PLMN basis. That is in some examples the capability information provided to a UE is valid throughout an entire PLMN. Accordingly updates are not required when moving across some regions within a PLMN.

According to some examples, the form is provided from the network to the UE in response to initial attachment of the UE at a PLMN. In some examples a form is provided to the UE when the PLMN detects the UE has no form or has an old version of the form for the PLMN. When a UE receives a new or updated version of a form for a PLMN, the UE may store the new or updated form. The UE may then provide the required capabilities information to the network.

In some examples the capability information the UE provides to the network may comprise a compressed representation of at least some capabilities. To this end the UE may be configured to compress UE capability information. The capability information may be in the form of one or more information elements (IEs). Each IE may be compressed to some extent e.g. not full length. For example the type or extent of compression may be based on the information required by the form. For example the compressed information may exactly match the information required by the form, and be indicated in the same order as in the form.

According to some examples a UE may acknowledge receipt of the form from the network. In some examples the UE reply may indicate "support" or "non-support" for each of the capabilities listed in the form. For example, the UE may provide information in a binary fashion e.g. where a "1" means supported and a "0" means non-supported, or vice versa.

According to some examples the form is stored in the UE on a "per-PLMN" basis. Therefore in some examples the UE may only need to store the form information once e.g. during initial attachment of the UE to the PLMN. The UE may store the form in non-volatile memory for use when the UE returns to the same PLMN e.g. after roaming to another PLMN or after detaching and reattaching to same PLMN.

According to some examples, once the capability information is stored in the UE (or during storing), the UE populates the received capability information required by the form with information regarding capabilities of the UE in question. By way of example, the received capability information may indicate to the UE that the PLMN requires knowledge of whether a particular one or more frequency bands is supported, and whether other parameters or capabilities are supported. Such parameters or capabilities may be those specified in 3GPP TS 36.306 and/or 38.306, for example. The UE may then generate this capability information, so that the capability information is available for sending to the PLMN when the PLMN requests it or when the UE, for example, performs initial registration to a PLMN or a registration following a change of PLMN or Radio transmission technology. Or the RAN may request the capability information using a UE capabilities enquiry, for example as specified in TS 38.331 or TS 36.331.

According to some examples a check or determination is made to see whether a UE is storing the latest information (e.g. the latest form). In some examples this check is carried out by the network. In some examples this check is carried out when the network requests information from the UE. The check may additionally or alternatively be carried out when information is received from the UE at the network. This may help the network to determine whether the network can trust the information from the UE to be consistent with the latest form used in the PLMN. In some examples, when it is determined by the network that the UE does have the latest form, then it may be determined that the capability information from the UE can be trusted to be up to date and used. In some examples, when it is determined by the network that the UE does not have the latest capability information (or does not have any capability information), then the network may e.g. in a (registration) response or a UE or RRC connection configuration update procedures provide the latest form to the UE.

Figure 5:
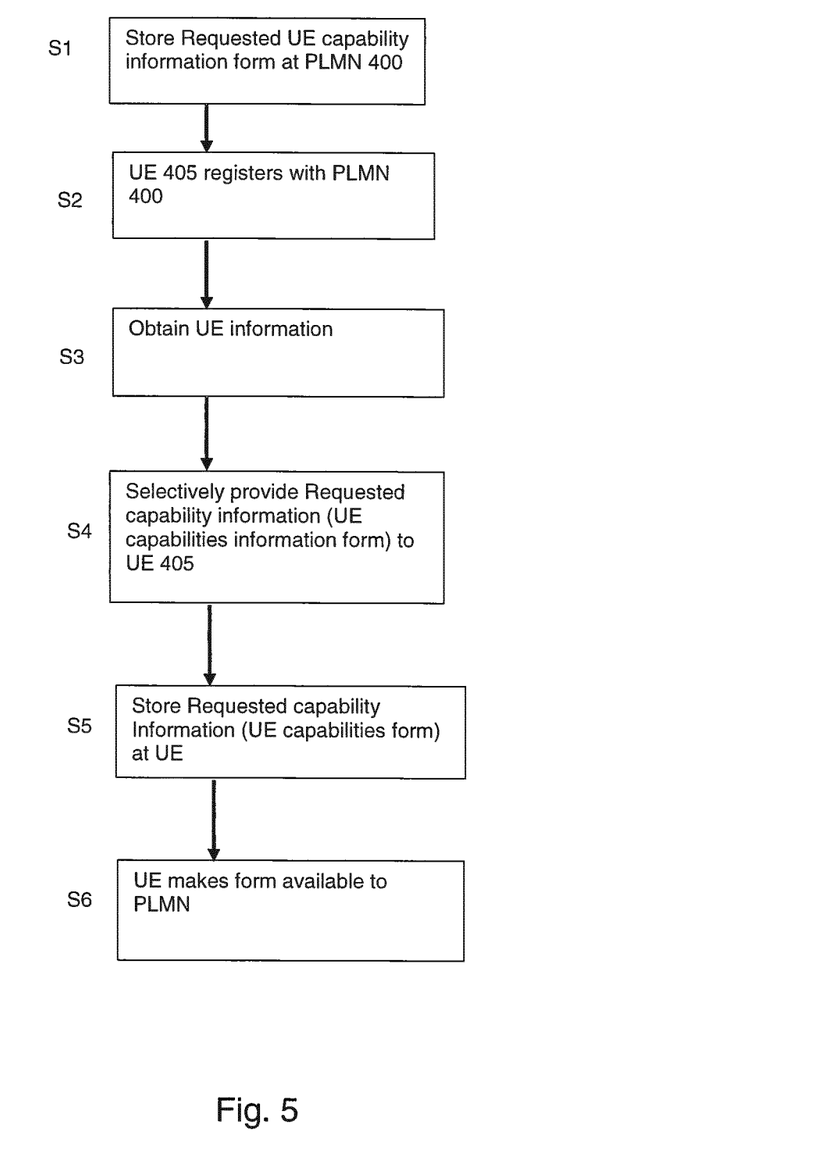
FIG. 5 is a flow chart of a method according to an example.

An example will now be described with respect to FIG. 5.

At S1, information is stored at a PLMN 400 (e.g. a PLMN node such as an MME or AMF or base station). In this example the information comprises information regarding UE capability information that the network wants or requires from one or more UEs. For example the UE capability information may be required for smooth operation of UEs in the network (e.g. handovers etc.). In this example the UE capability information required by the network is stored as a form, as described with respect to FIG. 4. The UE capability information required by the network (form) may be stored at a plurality of network nodes in the PLMN. For example a plurality of MMEs may each store forms having the same content.

At S2 a UE 405 registers with the PLMN 400. For example this may comprise the UE 405 being switched on or entering the PLMN 400.

At S3, the PLMN 400 obtains information of the UE 405. In some examples this comprises the PLMN 400 receiving information indicative of whether the UE 405 has the latest or most up to date UE capability information (e.g. by means of a form version number). To this end the UE may be configured to associate version information with a stored form, and associate version information with the generated capability information. This may enable the network to determine whether capability information generated by the UE is up-to-date or valid. Thus obtained information may also comprise capability information of the UE matching the form version the UE stores for the PLMN. For example this may comprise the UE providing a populated form as described with respect to FIG. 4 (if the UE already has one available). The populated form may comprise a combination of information elements, or a hash or a shorthand indication of which capabilities are supported by the UE 405 (e.g. the form may comprise a bitmap, where each bit is set if the UE capability relating to the matching entry in the form is supported).

In some examples the network may provide the form with a shorthand representation of the required capabilities. This may be the case if the capabilities in question comprise commonly obtained information corresponding to a current version of the form. This may enable the network to save storage. Furthermore the UE can subsequently send its capabilities in a very compact manner. The UE may continue to use this shorthand insofar as the shorthand does not change the capabilities the UE intends to use with the network. The UE may retain this shorthand for future use so long as the capability form does not change, to indicate the corresponding capability set.

In some examples the obtained information may also comprise a field that is indicative of whether the UE supports storage of the UE capability information form, and the related indication feature. For example a first value (e.g. 1) may indicate that the UE supports this feature (storage of UE capability information form, sending of capabilities according to the form, and storage and indication of any shorthands received from the network), and a second value (e.g. 0) may indicate that the UE does not support the feature. Alternately, the UE may indicate that it has no stored form, but that it supports the form feature (e.g. by indicating form version 0 or another reserved value to the same effect). For example, this may enable the PLMN 400 to determine whether to send a form to the UE 405, based on whether the feature is supported at the UE.

S4 comprises selectively providing a form or an updated form to UE 405.

When the PLMN 400 determines that the UE 405 needs the capability information form (e.g. because it isn't currently storing it) or needs new capability information (e.g. because the UE is storing out of date capability information), then S4 comprises sending a UE capability information form to the UE 405 from the PLMN 400. The UE capability information form may be sent from the core network (CN) to the UE 405. For example the capability information form may be sent from an MME (mobility management entity) or AMF (access and mobility management function) or base station (or via a base station) to the UE 405. According to some examples, when the UE 405 receives the capability information form it stores the form information in memory of the UE (e.g. non-volatile memory), along with an associated version number. This is shown at S5 in FIG. 4. In some examples the form is received as part of an attach accept/registration accept message.

Alternatively if it is determined that the UE 405 already has the most up to date capability information, then at S4 the PLMN 400 determines that it does not need to provide capability information to the UE 405.

According to some examples the CN sends the UE capability information to the RAN when the UE context is established in the RAN. For example this may be done using S1 (Evolved Packet System (EPS)) or N2 interface (5GS). In one example this may be performed in a backward compatible way: the UE capabilities information received in the CN is translated and provided to the RAN using existing information elements. In another example, if the RAN is known to support the optimised transfer of UE capability information disclosed herein, the CN forwards UE capability information received from UE without modification (alongside the form version number), and the RAN can perform the translation locally. The same may apply across X2/Xn interfaces of inter-MME/AMF interfaces if the UE capability information is transferred in X2/n HO or MMS/AMF relocation respectively.

According to some examples the UE may at any time be updated with a new capability information form. For example this may be by means of AMF in 5GS, using a UE Configuration update triggered by AMF or PCF of the serving PLMN. In some examples this is conducted independently of a registration procedure of the UE. If it has been conducted independently of the registration procedure, then the UE may proceed to a registration procedure updating the UE capabilities with the CN if required. Alternatively the UE can provide the UE capability information in a UE configuration update acknowledgment.

According to some examples a UE may store a UE capability information form at least for the serving PLMN of the UE. However it will be understood that in some examples a UE can store multiple UE capability information forms for respective multiple PLMNs. Thus in some examples a UE can reuse UE capability information for a given PLMN immediately when it returns to that PLMN, without having to perform a download of the form at that time. This obviates a need of configuring the UE with the UE capabilities information each time the UE returns to the PLMN.

In one example, for UE RADIO capabilities only, the capabilities information per PLMN is managed in the RAN, and the RAN provides the UE capabilities information to the UE in RRC message (e.g. in a RRC CONNECTION RECONFIGURATION message, or in a UE capabilities enquiry message). The UE may indicate the UE in the RRC connection setup complete (AKA RRC msg 5), the stored form version and the related UE capability information in compressed form in the same message. A value (e.g. 0) of the version of the form for the PLMN may mean that the UE can support optimised transfer of capability information as disclosed herein, but has no stored information at the time of checking. Alternately, the support of the feature in the UE is indicated separately. In some examples, if the UE does not store a form for the PLMN, but indicates support of the feature (e.g. in RRC msg5 (RRC connection setup complete)), the UE may receive the capability information in RRC connection reconfiguration or a UE capability information request in RRC.

Returning to FIG. 5, at S6 the UE makes the generated UE capability information e.g. populated form, available to the PLMN. In some examples, where the network provided the UE with shorthand representations or notations for the UE capability information, then the UE 405 may populate the form with such shorthand representations. The shorthand representations may be considered a code, in some examples. Accordingly it may be considered that the network (e.g. network node(s)) comprise a decoder for decoding shorthand representations received from the user equipment. In some examples the making the form available to the network comprises sending the form from the UE to the network.

Therefore it will be understood that in some examples the network can indicate to the UE the UE capability information that the network requires, and the network may also indicate to the UE a shorthand representation of how the capability information is to be made available or presented by the UE. Therefore in some examples it may be considered that the UE provides capability information in a format which matches a format indicated by the network. The format may comprise a bitmap. Therefore in some examples the UE stores the indications (i.e. indications of capability information to be made available) on a per-network basis, and the UE also stores a set of shorthands received from the network(s). In some examples the network is the entity that assigns the shorthands to the UE. The UE may then store, per-network: the form, and if shorthands are received, a shorthand and related generated information based on the indication.

In some examples if currently generated information at a UE matches a form that is already stored in the UE (alongside a shorthand), then the related shorthand is sent.

In some examples, if the UE does not store a shorthand, then the UE does not store generated capability information, but only the indication from the network. This efficiently utilizes memory at the UE.

One of the advantages of the disclosed examples may be considered that the UE can provide upfront, at registration time of the UE in the network, capabilities of the UE in the registration request based on a stored indication from the network. This information may be made compact by using any short hand, if available.

When a PLMN does not send a form to the UE, and the UE has no form stored, the UE may provide UE capability information to the network in a legacy mode. This may occur for example where the UE does not support the form feature, or if there is a temporary failure with the form feature for some reason.

In some examples where the UE receives a UE radio capabilities enquiry from a RAN node without indication the form based mode is required, but is from a PLMN that is known by the UE to support the form feature, the UE may use the form it stores. This may optimise the information sent. In such examples the form may be sent without shorthand. Network operators may also ensure that they cover capabilities used by nodes that do not support the feature. Alternately, a UE may just send information without optimisation to these RAN nodes that are not yet upgraded.

In some examples, when the RAN receives the UE capability information, the RAN may translate the information. For example the RAN may translate the UE capability information to a legacy or traditional format when it sends the information to peer nodes (e.g. over X2,n it S1/N2) if the peer nodes are not known to support the feature.

In some examples the UE, RAN, CN can at any time defer to a non-optimised (e.g. legacy) mode if peer nodes do not support the optimised mode. Indication of support may be added to the relevant interfaces, in some examples.

Thus it will be understood that examples may reduce or limit the amount of information that needs to be sent from the network to the UE, and/or limit how often the UE capability information needs to be sent from the network to the UE (for example compared to the frequency band filter information currently sent out). By using the form, the PLMN receives UE capability information in an expected manner and not in a manner that is at discretion of the UEs (e.g. the UEs may truncate the size using local polices, or just send all their capabilities but this may not fit the maximum size of the messages to the network, so these need to get truncated). This may result in more efficient processing and/or storage of the information at the network. Examples may also enable PLMN-wide applicability, which differs from current implementations where decisions are left to each RAN node which may cause issues. In some examples the UE capability information may comprise a bitmap. This may enable a simple representation of the UE capability information. In some examples the capability information may be stored as a bitmap in the network nodes and/or in the UEs. Therefore in some examples the UE(s) may be configured to transmit UE capability information as a bitmap. In some examples certain capability information is expressed in an IE e.g. information of maximum bit rate. Nevertheless this differs from current implementations where capabilities are only ever sent as IEs that are not dependent on matching a request by the network in the same order as received in a form or filter sent to the UE. In some examples the UE capability information is sent to the network as a vector of capabilities where different options for one parameter are identified by a bitmap rather than explicit indication of a value. Although storing forms for several PLMNs may require additional storage of information at the UE, this is considered a worthwhile trade-off to achieve the reduced UE-network signalling to signal the form at every visit in a PLMN.

Figure 6:
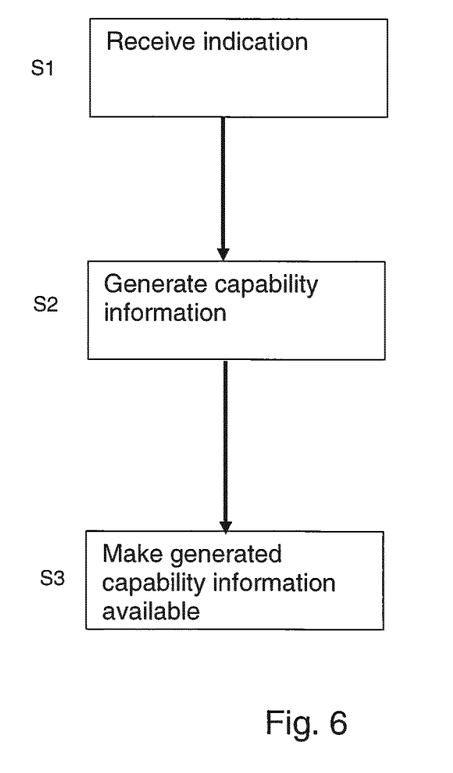
FIG. 6 is a flow chart of a method according to an example.

FIG. 6 is a flow chart of a method according to an example. The flow chart of FIG. 6 is viewed from the perspective of an apparatus such as a UE, for example.

At S1, the apparatus receives an indication of a set of at least two different capabilities of the apparatus that are to be made available to a network in which the apparatus is operating.

At S2, the method comprises the apparatus generating capability information of the apparatus in accordance with the received indication.

At S3, the method comprises the apparatus making the generated capability information available to the network.

Figure 7:
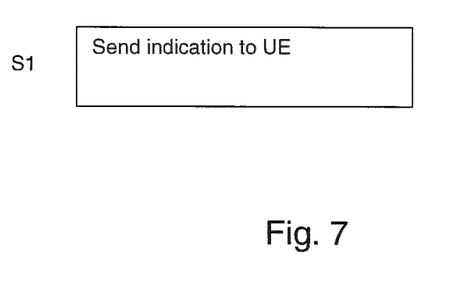
FIG. 7 is a flow chart of a method according to an example.

FIG. 7 is a flow chart of a method according to an example. The flow chart of FIG. 7 is viewed from the perspective of an apparatus such as a network node, for example.

At S1, the apparatus sends an indication of a set of at least two different capabilities of a user equipment that are to be made available by the user equipment to a network in which the user equipment is operating.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As used in this application, the term "circuitry" may refer to one or more or all of the following: (a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation."

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The embodiments of this invention may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed there is a further embodiment comprising a combination of one or more embodiments with any of the other embodiments previously discussed.

The invention claimed is:

1. An apparatus, comprising:
   at least one processor; and
   at least one memory including computer program code, the at least one memory and the computer program code configured to, with the at least one processor, cause the apparatus at least to perform:
   registering to a network in which the apparatus is operating;
   transmitting information indicating whether the apparatus has a latest indication of a set of at least two different capabilities of the apparatus that are to be made available by the apparatus to the network, wherein the indication is a shorthand representation of the set of the at least two different capabilities for use by the apparatus in storing capability information;
   upon the information indicating that the apparatus does not have the latest indication of the set of the at least two different capabilities, receiving, from the network in which the apparatus is operating, the latest indication of the set of the at least two different capabilities of the apparatus;
   storing the received latest indication at the apparatus;
   associating the received latest indication with the network;
   generating capability information of the apparatus in accordance with the received latest indication; and
   making the generated capability information available to the network.

2. The apparatus according to claim 1, wherein the indication of the set of the at least two different capabilities comprises at least two fields corresponding to the at least two different capabilities of the apparatus, wherein the at least one memory and the computer program code are configured to, with the at least one processor, cause the apparatus to further perform populating the at least two fields.

3. The apparatus according to claim 1, wherein the indication of the set of the at least two different capabilities comprises a form.

4. The apparatus according to claim 1, wherein the at least one memory and the computer program code are configured to, with the at least one processor, cause the apparatus to further perform receiving the indication in response to registration of the apparatus in the network.

5. The apparatus according to claim 1, wherein the at least one memory and the computer program code are configured to, with the at least one processor, cause the apparatus to further perform generating the capability information in a format that matches a format indicated by the network.

6. The apparatus according to claim 5, wherein the format comprises a bitmap.

7. The apparatus according to claim 1, wherein the at least one memory and the computer program code are configured to, with the at least one processor, cause the apparatus to further perform storing the generated capability information in a compressed manner.

8. The apparatus according to claim 1, wherein the at least one memory and the computer program code are configured to, with the at least one processor, cause the apparatus to further perform associating version information to the stored indication received from the network, and associating version information to the generated capability information, for enabling the network to determine whether the stored indication from the network and corresponding generated capability information is valid.

9. The apparatus according to claim 1, wherein the stored capability information indicated by the network is valid throughout the network.

10. The apparatus according to claim 1, wherein the at least one memory and the computer program code are configured to, with the at least one processor, cause the apparatus to further perform storing received indications of capability information for two or more different networks.

11. An apparatus, comprising:
   at least one processor; and
   at least one memory including computer program code, the at least one memory and the computer program code configured to, with the at least one processor, cause the apparatus at least to perform:
   detecting registration of a user equipment in a network;
   receiving information indicative of whether the user equipment has a latest indication of a set of at least two different capabilities of the user equipment that are to be made available by the user equipment to the network, wherein the indication is a shorthand representation of the set of the at least two different capabilities for use by the user equipment in storing user equipment capability information; and when it is determined that the user equipment does not have the latest indication of the set of the at least two different capabilities of the user equipment, sending, to the user equipment in response to detecting the registration, the latest indication of the set of the at least two different capabilities of the user equipment.

12. The apparatus according to claim 11, wherein the at least one memory and the computer program code are configured to, with the at least one processor, cause the apparatus to further perform receiving capability information from a user equipment in the network in accordance with the indication of the set of the at least two different capabilities.

13. The apparatus according to claim 11, wherein the at least one memory and the computer program code are configured to, with the at least one processor, cause the apparatus to further perform decoding shorthand representation information received from the user equipment.

14. A method, comprising:
    detecting registration of a user equipment in a network;
    receiving information indicative of whether the user equipment has a latest indication of a set of at least two different capabilities of the user equipment that are to be made available by the user equipment to the network, wherein the indication is a shorthand representation of the set of the at least two different capabilities for use by the user equipment in storing user equipment capability information; and
    when it is determined that the user equipment does not have the latest indication of the set of the at least two different capabilities of the user equipment, sending, to the user equipment in response to detecting the registration, the latest indication of the set of the at least two different capabilities of the user equipment.

15. A computer program embodied on a non-transitory computer-readable medium, the computer program comprising instructions for causing an apparatus to perform at least the following:
    detecting registration of a user equipment in a network;
    receiving information indicative of whether the user equipment has a latest indication of a set of at least two different capabilities of the user equipment that are to be made available by the user equipment to the network, wherein the indication is a shorthand representation of the set of the at least two different capabilities for use by the user equipment in storing user equipment capability information; and
    when it is determined that the user equipment does not have the latest indication of the set of the at least two different capabilities of the user equipment, sending, to the user equipment in response to detecting the registration, the latest indication of the set of the at least two different capabilities of the user equipment.

16. A method, comprising:
    registering to a network in which an apparatus is operating;
    transmitting information indicating whether the apparatus has a latest indication of a set of at least two different capabilities of the apparatus that are to be made available by the apparatus to the network, wherein the indication is a shorthand representation of the set of the at least two different capabilities for use by the apparatus in storing capability information;
    upon the information indicating that the apparatus does not have the latest indication of the set of the at least two different capabilities, receiving, from the network in which the apparatus is operating, the latest indication of the set of the at least two different capabilities of the apparatus;
    storing the received latest indication at the apparatus;
    associating the received latest indication with the network;
    generating capability information of the apparatus in accordance with the received indication; and
    making the generated capability information available to the network.

17. A computer program embodied on a non-transitory computer-readable medium, the computer program comprising instructions for causing an apparatus to perform at least the following:
    registering to a network in which the apparatus is operating;
    transmitting information indicating whether the apparatus has a latest indication of a set of at least two different capabilities of the apparatus that are to be made available by the apparatus to the network, wherein the indication is a shorthand representation of the set of the at least two different capabilities for use by the apparatus in storing capability information;
    upon the information indicating that the apparatus does not have the latest indication of the set of the at least two different capabilities, receiving, from the network in which the apparatus is operating, the latest indication of the set of the at least two different capabilities of the apparatus;
    storing the received latest indication at the apparatus;
    associating the received latest indication with the network;
    generating capability information of the apparatus in accordance with the received latest indication; and
    making the generated capability information available to the network.

* * * * *